United States Patent Office 3,526,681
Patented Sept. 1, 1970

3,526,681
TRIS(CHLORO SULFONYLARYL) PHOSPHATES
AND A METHOD FOR PREPARING SAME
Jackson Pollard English, Princeton, and John James Hand,
Trenton, N.J., assignors to American Cyanamid Company, Stamford, Conn., a corporation of Maine
No Drawing. Filed Apr. 25, 1967, Ser. No. 633,387
Int. Cl. C07f 9/22; A01n 9/36
U.S. Cl. 260—949                    6 Claims

ABSTRACT OF THE DISCLOSURE

New compounds of the class tris(substituted sulfonylaryl) phosphates are described. Their preparation from readily available starting materials is also delineated. These compounds are useful as intermediates in the preparation of compounds having anthelmintic activity. The conversion of the present compounds into anthelmintic compounds is described. Testing procedures and results on a number of the anthelmintic compounds is summarized.

BACKGROUND OF THE INVENTION

There have been previous attempts to carry out substitution reactions on aryl groups attached to phosphorus through an oxygen atom. Most of the reactions have involved attempts to nitrate the aryl group. However, there does not appear to have been any previous attempts to chlorosulfonate an aryl group attached to phosphorus by means of an oxygen bond such as exists in triphenylphosphates of the present invention.

SUMMARY OF THE INVENTION

Compounds of the present invention have not been previously disclosed. They may be illustrated by the following formula:

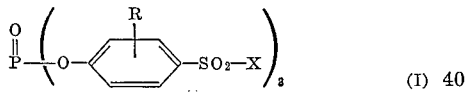
(I)

wherein R is selected from the group consisting of hydrogen and lower alkyl and X is selected from the group consisting of chloro, amino, lower alkylamino and di(lower alkyl)amino. These compounds are useful as intermediates in preparing compounds which are effective in controlling and treating helminthiases in warm-blooded animals. For example, when a compound of the formula:

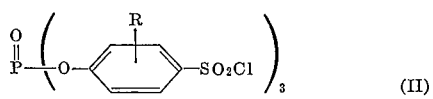
(II)

wherein R is as defined above, is reacted with an amine of the formula:

NHR$^1$R$^2$ wherein R$^1$ and R$^2$ are selected from the group consisting of hydrogen and lower alkyl, a compound of the following formula is produced:

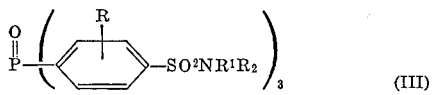
(III)

wherein R, R$^1$ and R$^2$ are as defined above. Compounds of Formulas II and III are those represented generically by Formula I, i.e., the subject compounds of the invention. When a Formula III compound is treated with an alkali hydroxide, a compound of the following formula is produced.

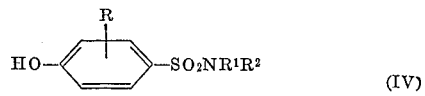
(IV)

wherein R, R$^1$ and R$^2$ are as defined above. U.S. Pat. No. 3,309,270, having an assignee in common with this invention, discloses that when a compound represented by Formula IV, but in which R$^1$ and R$^2$ are lower alkyl only, is reacted with either di-lower alkylphosphoro-chloridothionate or di-lower alkylphosphorochloridate, compounds represented by the following formula are produced:

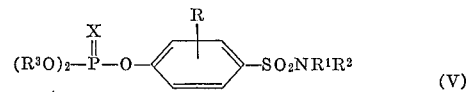
(V)

wherein R, R$^1$, R$^2$, and R$^3$ are lower alkyl, and X is selected from the group consisting of oxygen or sulfur. Formula V compounds are effective anthelmintics as demonstrated by Examples II and III of U.S. Pat. No. 3,309,270 and by Examples 10 and 11 of the present application.

The description in U.S. Pat. No. 3,309,270 reveals a route for preparing Formula IV compounds which comprises reacting an appropriate benzene sulfonate with acetic anhydride to form the corresponding acetoxy benzene sulfonate which is then reacted with phosphorous pentachloride to produce a corresponding acetoxy benzene sulfonylchloride which may then be reacted with a suitable diloweralkylamine to produce a Formula IV compound. An advantage of the present method of preparing compounds of Formula IV is the use of inexpensive and readily available starting materials such as triphenylphosphate, tri-m-tolylphosphate, and chlorosulfonic acid as compared to compounds such as the potassium phenol sulfonates, acetic anhydride, and phosphorous pentachloride which are required by the methods described in U.S. Pat. No. 3,309,270.

DESCRIPTION OF THE PREFERRED EMBODIMENTS

This invention relates to novel and useful tris(substituted-sulfonylaryl) phosphates represented by the structure:

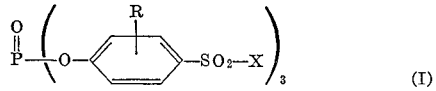
(I)

wherein R is selected from the group consisting of hydrogen and lower alkyl and X is selected from the group consisting of chloro, amino, mono lower alkylamino and dilower alkylamino. This invention further relates to a method of preparing compounds of Formula I. Among the compounds which are illustrative of compounds of the present invention, are the following: tris(p-chlorosulfonylphenyl) phosphate; tris(p-chlorosulfonyl-m-tolyl) phosphate; tris(p-chlorosulfonyl - 3 - butylphenyl) phosphate; tris(p - chlorosulfonyl-2-propylphenyl) phosphate; tris(p-chlorosulfonyl-3-ethylphenyl) phosphate; tris(p-sulfamyl-m-tolyl) phosphate; tris(p-[N-dimethylsulfamyl]-m-tolyl) phosphate; tris(p-[N,N-dimethylsulfamyl]-m-tolyl) phosphate; tris(p-[N-butyl - N - methylsulfamyl]phenyl) phosphate; and tris(p-[N,N-dimethylsulfamyl]-3-butylphenyl) phosphate; and the like.

The compounds represented by Formula I are prepared by reacting an appropriate triarylphosphate such as triphenylphosphate or tri-m-tolylphosphate with chlorosulfonic acid at temperatures ranging from 50° to 100° C., with a preferred temperature range of about 60° C. to 80° C. This reaction will produce the desired tris(p-chlorosulfonylaryl) phosphate compounds (II) which after purification may be reacted with ammonia, a primary amine such as methylamine, or a secondary amine such as dimethylamine or diethylamine. This reaction may be carried out in any suitable solvent such as acetonitrile at temperatures ranging from 0° to 100° C., with a preferred reaction temperature range of about 20° to 50° C. This latter reaction will produce the tris(sulfamylaryl) phosphate or tris(N-alkylsulfamylaryl) phosphate compounds (III) which may then be subsequently treated with an aqueous or alcoholic solution of an alkali hydroxide such as potassium hydroxide at temperatures of about 90° C., to produce Formula IV compounds which may then be reacted with the desired phosphorochloridoithionate or phosphorochloridate to produce the corresponding anthelmintics compounds (V).

DETAILED DESCRIPTION

The following examples are intended to be illustrative of the present invention and not to limit the invention to the specific compounds and conditions described therein.

Example 1

Preparation of tris(p-chlorsulfonylphenyl)phosphate.—A liter flask, equipped with stirrer, air condenser, dropping funnel and thermometer, is charged with 349.5 g. (3 moles) of chlorosulfonic acid. The recation temperature is maintained at 10–15° C., while 41.24 g. (0.126 mole) of triphenyl phosphate is added slowly. The reaction mixture is warmed slowly on a steam bath to 80° C. when the evolution of hydrogen chloride becomes evident. This temeprature is mantained for two hours when the evolution of the gas has stopped. The reaction mixture is poured cautiously into a stirring mixture of ice and water. The water is decanted from the precipitated product and the sticky product washed by decantation. The product is slurred with ice cold acetonitrile, recovered by filtration and dried under reduced pressure overnight. The yield is 52.6 g. (0.0854 mole), 65%, melting point 101.5–117.5° C. Structure is determined by means of infra-red analytical techniques and analysis. An analytical sample, melting point 119–120.5° C., is prepared by recrystallizing an aliquot twice from acetonitrile.

Example 2

Preparation of tris(4-chlorosulfonyl-m-tolyl)phosphate.—A 500 ml. 4-neck flask equipped with stirrer, air condenser with drying tube, thermometer and dropping funnel is charged with 174 g. (1.5 moles) at 99% chlorosulfonic acid. Then 36.8 g. (1.5 mole) of tri-m-tolylphosphate are added while the internal temperature is maintained at 10–15° C. The reaction mixture is allowed to warm to room temperature and then heated at 84° C., for five hours. The reaction mixture is drowned in a mixture of ice and water. The solid which separated is washed by decantation. The wet product is slurred with warm acetonitrile, cooled and filtered. The yield of material, melting point 101.5–105° C. (cloudy) is 34.5 g. (0.052 mole), 52%. Two recrystallizations from acetonitrile gives an analytical sample melting point 108.5–109° C. Structure is determined using infra-red analytical techniques and analysis.

Example 3

Preparation of tris(p-sulfamyl-m-tolyl)phosphate and 4-hydroxy-2-methylbenzene sulfonamide.—A solution of 6.6 g. (0.01 mole) of tris(4-chlorosulfonyl-m-tolyl)-phosphate in acetonitrile is saturated with anhydrous ammonia. A precipitate, believed to be ammonium chloride, separates immediately. The solvent and excess ammonia are removed by evaporation and the residue extracted with acetone. The acetone extract is evaporated to a syrup which is partitioned between ethyl acetate and water. The organic phase is separated, dried and concentrated to a syrup. The residue, tris(p-sulfamyl-m-tolyl)phosphate, is treated with 4.8 g. (0.0727 mole) of 86% potassium hydroxide in water and heated at 90° C. two hours and left standing overnight. The mixture is clarified with activated charcoal and acidified. The crytsals which separated on refrigeration are collected by filtration, washed with water and with acetonitrile (wt. 0.55 g.). The product has an infra-red spectrum which is identical to that of 4-hydroxy-2-methylbenzene sulfonamide. An additional 1.65 g. of less pure material is obtained by concentrating the mother liquor giving a total yield of phenol of 2.20 g. (.0117 mole), 39%.

Example 4

Preparation of tris(p-[N,N-dimethylsulfamyl]-m-tolyl)phosphate and N,N-dimethyl-4-hydroxy-2-methylbenzene sulfonamide.—Tris(p-chlorosulfonyl-m-tolyl) phosphate is contacted with dimethylamine in a manner similar to that shown in Example 3 to produce tris(p-[N,N-dimethylsulfamyl]-m-tolyl)phosphate. The latter compound is then hydrolyzed with potassium hydroxide as in Example 3 to produce N,N-dimethyl-4-hydroxy-2-methylbenzene sulfonamide.

Example 5

Preparation of tris-(p-[N-methylsulfamyl]phenyl)-phosphate and N-methyl-4-hydroxybenzene sulfonamide.—Tris(p-chlorosulfonylphenyl)phosphate is contacted with methylamine in a manner similar to that described in Example 3 to produce tris-(p-[N-methylsulfamyl]-sulfonylphenyl)phosphate. The latter compound is then hydrolyzed with potassium hydroxide as in Example 3 to produce N-methyl-4-hydroxybenzene sulfonamide.

Example 6

Preparation of tris(p-[N,N-diethylsulfamyl]-m-tolyl)-phosphate and N,N-diethyl-4-hydroxy-2-methylbenzene sulfonamide.—Tris(p-chlorosulfonyl-m-tolyl)phosphate is contacted with diethylamine in the manner described in Example 3 to produce tris(p-[N,N-diethylsulfamyl]-m-tolyl)phosphate. The latter compound is hydrolyzed with potassium hydroxide as shown in Example 3 to produce N,N-diethyl-4-hydroxy-2-methylbenzene sulfonamide.

Example 7

Preparation of phosphorothioic acid, O,O-dimethyl-O-(3-methyl-4-N,N-diethylsulfamyl)-phenyl ester.—A mixture of 12.45 g. (0.0513 mole) of N,N-diethyl-4-hydroxy-2-methylbenzene sulfonamide and 25.7 ml. (0.0513 mole) of 2 N sodium hydroxide is stirred until most of the solid material is dissolved, and then 16.4 g. (0.1026 mole) of dimethylphosphorochloridothioate is added all at once. The reaction is stirred with an efficient stirrer and sodium hydroxide solution is added intermittently to maintain a pH between 9.5 and 10.0. Enough acetone is added shortly after the reaction is started to obtain a homogeneous reaction mixture and additional acetone is added during the course of the reaction to prevent the separation of a second phase. After stirring at about 45° C. for seven hours, the reaction is estimated to be 91% complete, based on the base consumed. The reaction mixture is buffered with solid sodium bicarbonate and left stirring overnight. The product is dissolved in ether. The ether solution is washed with water and dried over sodium sulfate. Evaporation of the ether leaves 16.5 g. (0.045 mole), 88% of crude oily material. The product is purified by molecular distillation at 0.001 mm. pressure and a temperature of 110° C. The distilled material having an $n_D^{25}$ 1.5349–1.5360 is obtained.

Example 8

Preparation of phosphorothioic acid, O,O-dimethyl-O-(3-methyl-4-N,N-dimethylsulfamyl)-phenyl ester.—A 500 ml. round bottom flask, equipped with an efficient vibrating-type stirrer is charged with 6.9 g. (0.032 mole) of N,N-dimethyl-4-hydroxy-2-methylbenzene sulfonamide, 13.2 g. (0.096 mole) of anhydrous potassium carbonate, 100 ml. of water and 100 ml. of acetone. The reaction mixture is stirred a few minutes to obtain a homogenous solution and 10.27 g. (0.064 mole) of diemthylphosphoridothionate is added all at once. The mixture is left stirring overnight (16 hours). The product is recovered by two extractions with ether. The combined ether extracts are washed with water, potassium carbonate solution and again with water. The ether solution is dried over sodium and magnesium sulfates and evaporated. This gives a crude product of melting point 70.5–72° C. After slurrying with ether and filtering, there remains a white crystalline product, melting point 71.5–72° C. An analytical sample, melting point 72.5–73° C. is obtained by recrystallizing a small amount from ether.

Example 9

Preparation of phosphoric acid, O,O-dimethyl-O-(3-methyl-4-N,N-dimethylsulfamyl)-phenyl ester.—A mixture of 10.8 g. of N,N-dimethyl-4-hydroxy-2-methylbenzene sulfonamide and 2.05 g. of sodium hydroxide in aqueous mixture is stirred until most of the solid dissolves and the corresponding sodium salt is produced. The salt is then slurried in 100 ml. of acetonitrile and refluxed at 81° C. The heat is turned off and 7.98 g. of dimethylphosphorochloridate slowly added at a rate that reflux continues. The mixture is heated again for 10 minutes and then cooled and stripped. The product is poured into 500 ml. of ethyl ether and the phosphate dissolves. This solution is filtered and stripped leaving 16.0 g. of crude material. The product purified by molecular distillation at 0.001 mm. pressure and a temperature of 150° C. yields material having $n_D^{25}$ 1.5046.

Example 10

In the following test, six-week old rabbits are orally inoculated with about 2000 larvae of the economically important sheep nematode Trichostrongylus colubriformis (the bankrupt worm). The rabbits are then held for three weeks in order to permit the infection to mature, and an egg count in the rabbit feces is made to insure that the infection has taken. Compounds to be tested are suspended in water and administered orally through a stomach tube to infected rabbits. Four days after treatment the rabbits are sacrificed and their intestinal tracts removed. The contents of the intestinal tracts are examined and the efficacy of the drugs tested determined by comparing the number of worms in treated and untreated animals. The anthelmintic action of the subject compounds is clearly illustrated in Table I below.

TABLE I.—EFFICACY AGAINST THE SHEEP NEMATODE, *TRICHOSTRONGYLUS COLUBRIFORMS* IN RABBITS OF COMPOUNDS PREPARED USING THE COMPOUNDS OF THIS INVENTION

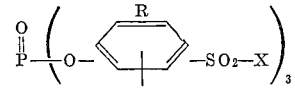

| Compound | X | $R^1$ | $R^2$ | R | Dose for >70% Helminth removal, mg./kg. |
|---|---|---|---|---|---|
| A | S | $CH_3$ | $CH_3$ | $CH_3$ | 100 |
| A' | S | $CH_3$ | $CH_3$ | H | 60 |
| B | O | $CH_3$ | $CH_3$ | $CH_3$ | 50 |
| B' | O | $CH_3$ | $CH_3$ | H | >10 |
| C | S | $C_2H_5$ | $C_2H_5$ | $CH_3$ | 500 |
| C' | S | $C_2H_5$ | $C_2H_5$ | H | >205 |

Example 11

In the following tests white mice are orally inoculated with ±100 infective eggs of Aspiculuris tetraptera. The mice are given a commercial mash laboratory diet and permitted to feed ad libitum for the following 8 days. One day following the initiation of medicated feed these mice are orally inoculated with approximately 10,000 infective eggs of swine ascarid Ascaris suum. Seven days after inoculation with the infective eggs of Ascaris suum the mice are killed. Their lungs, liver and intestines are removed and examined; lung and liver for pathological changes due to larval ascarids and their intestines for the number of adult Aspiculuris worms present. The results of these tests are summarized in Table II below, which clearly demonstrates the effectiveness of the compounds prepared from compounds of the present invention against the larval stages of Ascaris suum and the adult Aspiculuris tetraptera. No toxicity is seen with the anthelmintically effective concentrations.

TABLE II.—EFFICACY AGAINST LARVAL AND ADULT STAGES OF HELMINTHS

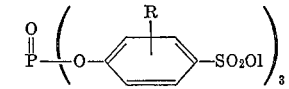

| | | | | | Activity in mice vs. | | | | |
| | | | | | Aspiculuris tetraptera | | Ascaris suum | | |
| compound | $R^3$ | X | $R^1$ | $R^2$ | R | Percent compound in diet | Avg. No. adult worms | Percent compound in diet | Avg. No. larvae per mouse | Avg. lung lesions |
|---|---|---|---|---|---|---|---|---|---|---|
| A | $CH_3$ | S | $CH_3$ | $CH_3$ | $CH_3$ | .05 | 0 | 0.1 | 1.0 | None. |
| C | $CH_3$ | S | $C_2H_5$ | $C_2H_5$ | $CH_3$ | 0.025 0.1 | 0 0 | 0.1 | 4.0 | Do. |
| Control | | | | | | 0.0 | >20 | 0.0 | 270 | Severe. |

We claim:
1. A compound of the formula:

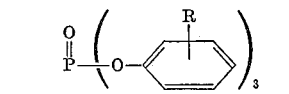

wherein R is selected from the group consisting of hydrogen and lower alkyl, and X is chloro.
2. The compound in accordance with claim 1: tris(p-chlorosulfonylphenyl) phosphate.
3. The compound in accordance with claim 1: tris(p-chlorosulfonyl-m-tolyl) phosphate.
4. A method for preparing compounds of the formula:

$$\overset{O}{\underset{}{P}}\!\!-\!\!\left(\!O\!-\!\!\underset{}{\bigcirc}\!\!\overset{R}{\underset{}{\phantom{|}}}\!\!-\!\!SO_2Cl\right)_{\!3}$$

wherein R is selected from the group consisting of hydrogen and lower alkyl which comprises reacting a triarylphosphate of the formula:

$$\overset{O}{\underset{}{P}}\!\!-\!\!\left(\!O\!-\!\!\underset{}{\bigcirc}\!\!\overset{R}{\underset{}{\phantom{|}}}\right)_{\!3}$$

wherein R is as described above, with chlorosulfonic acid at a temperature of from about 50° C. to 100° C. and recovering said compound therefrom.
5. A method according to claim 4, wherein R is hydrogen.
6. A method according to claim 1 wherein R is methyl.

References Cited

Wagner et al., "J. Med. Chem." vol. 8, No. 3 (1965), pp. 377–383.

Herweh, "J. Org. Chem." (England), vol. 31, No. 7 (1966), pp. 2422–4.

CHARLES B. PARKER, Primary Examiner

A. H. SUTTO, Assistant Examiner

U.S. Cl. X.R.

260—944, 968, 984; 424—211